US012692892B1

(12) United States Patent (10) Patent No.: US 12,692,892 B1

Wigboldy et al. (45) Date of Patent: Jul. 28, 2026

(54) WALL SYSTEM FASTENER WITH SEAL MEMBER

(71) Applicant: Altenloh, Brinck & Co. US, Inc., Bryan, OH (US)

(72) Inventors: Jason R. Wigboldy, Grand Rapids, MI (US); Mitchell B. Mahler, Grand Rapids, MI (US)

(73) Assignee: Altenloh, Brinck & Co. US, Inc., Bryan, OH (US)

( * ) Notice: Subject to any disclaimer, the term of this patent is extended or adjusted under 35 U.S.C. 154(b) by 0 days.

(21) Appl. No.: 18/344,263

(22) Filed: Jun. 29, 2023

Related U.S. Application Data

(62) Division of application No. 16/859,764, filed on Apr. 27, 2020, now Pat. No. 11,698,095.

(60) Provisional application No. 62/838,425, filed on Apr. 25, 2019.

(51) Int. Cl.
 *F16B 43/00* (2006.01)
 *F16B 23/00* (2006.01)
(52) U.S. Cl.
 CPC .......... *F16B 23/0007* (2013.01); *F16B 43/00* (2013.01)
(58) Field of Classification Search
 CPC .............................. F16B 23/0007; F16B 43/00
 See application file for complete search history.

(56) References Cited

U.S. PATENT DOCUMENTS

| | | |
|---|---|---|
| D32,793 S | 6/1900 | Fauber |
| 970,423 A | 9/1910 | Cunningham |
| 1,108,922 A | 9/1914 | Menten |
| 1,925,774 A * | 9/1933 | Phillips ................. E04F 13/045 52/346 |
| 2,262,130 A | 11/1941 | Bagley |
| 2,304,333 A | 12/1942 | Bossi |
| 2,688,894 A | 9/1954 | Modrey |

(Continued)

FOREIGN PATENT DOCUMENTS

| | | |
|---|---|---|
| CA | 2234485 A1 | 10/1999 |
| CA | 2690819 C | 8/2012 |

(Continued)

OTHER PUBLICATIONS

Brochure disclosing 2" diameter Plasti-Grip® PBLP2 washer distributed by Rodenhouse Inc. more than one year prior to Sep. 6, 2012.

(Continued)

*Primary Examiner* — Basil S Katcheves
(74) *Attorney, Agent, or Firm* — Gardner, Linn, Burkhart & Ondersma LLP

(57) ABSTRACT

A wall fastener assembly for use with a building wall system, with the wall fastener assembly including a fastener and an elongated, semi-rigid seal member. The fastener includes a shaft and a head, with the fastener configured to be secured to the wall system. The seal member includes opposed first and second ends, and a center bore that extends along the length of the seal member and is configured to receive the shaft of fastener. When the fastener is secured to the wall system the first end of the seal member is configured to compress against a portion of the wall system to form a first seal and the opposite second end of the seal member is configured to form a second seal to thereby seal the wall fastener assembly against the wall system.

18 Claims, 7 Drawing Sheets

(56) References Cited

U.S. PATENT DOCUMENTS

| | | | |
|---|---|---|---|
| 2,741,289 A * | 4/1956 | Grow | F16B 39/282 |
| | | | 411/397 |
| 3,069,919 A | 12/1962 | Schultz, Jr. | |
| 3,299,766 A | 1/1967 | Gould et al. | |
| 3,315,720 A | 4/1967 | Gutshall | |
| 3,389,525 A | 6/1968 | Moody | |
| 3,523,395 A | 8/1970 | Rutter et al. | |
| 3,828,493 A * | 8/1974 | Vezmar | F16B 5/0258 |
| | | | 411/391 |
| 4,102,239 A | 7/1978 | Dallas | |
| 4,114,597 A | 9/1978 | Erb | |
| 4,292,876 A | 10/1981 | De Graan | |
| 4,619,094 A * | 10/1986 | Yang | E04D 5/147 |
| | | | 52/509 |
| 4,715,756 A | 12/1987 | Danico et al. | |
| 4,793,757 A | 12/1988 | Peterson | |
| 4,842,465 A * | 6/1989 | Pease | F16L 59/12 |
| | | | 411/522 |
| 4,909,961 A | 3/1990 | Bögel | |
| 4,959,938 A * | 10/1990 | De Caro | F16B 31/02 |
| | | | 411/413 |
| 5,069,589 A * | 12/1991 | Lemke | E04D 5/145 |
| | | | 411/533 |
| 5,079,055 A | 1/1992 | Doyle | |
| 5,419,666 A | 5/1995 | Best | |
| 5,423,858 A | 6/1995 | Bolanos et al. | |
| 5,517,883 A | 5/1996 | Goldi et al. | |
| 5,541,377 A | 7/1996 | Stuhlmacher | |
| 5,662,444 A | 9/1997 | Schmidt, Jr. | |
| 5,759,001 A | 6/1998 | Smith | |
| 5,803,693 A | 9/1998 | Choiniere et al. | |
| 5,833,422 A | 11/1998 | Haga et al. | |
| D410,869 S | 6/1999 | Singer | |
| 5,907,938 A | 6/1999 | Sheahan | |
| 5,908,278 A * | 6/1999 | Hasan | E04D 5/145 |
| | | | 411/533 |
| 5,979,123 A * | 11/1999 | Brockman | A01M 1/24 |
| | | | 52/517 |
| 6,035,595 A * | 3/2000 | Anderson | E04F 13/045 |
| | | | 52/363 |
| 6,039,525 A | 3/2000 | Johnson | |
| 6,183,182 B1 * | 2/2001 | Baumgartner | E04D 3/3603 |
| | | | 411/533 |
| 6,212,841 B1 | 4/2001 | Plume | |
| 6,231,063 B1 | 5/2001 | Chi | |
| D482,270 S | 11/2003 | Derilo | |
| 6,665,991 B2 * | 12/2003 | Hasan | E04D 5/14 |
| | | | 411/545 |
| D517,404 S | 3/2006 | Schluter | |
| 7,090,455 B2 | 8/2006 | Lamb | |
| D549,091 S | 8/2007 | McIntyre et al. | |
| 7,415,803 B2 | 8/2008 | Bronner | |
| 7,416,362 B2 | 8/2008 | North | |
| D576,480 S | 9/2008 | Vakiener et al. | |
| D596,934 S | 7/2009 | Vakiener et al. | |
| D634,248 S | 3/2011 | Chen | |
| 7,896,380 B2 | 3/2011 | Tange | |
| D644,921 S | 9/2011 | Hsu et al. | |
| D645,337 S | 9/2011 | Hsu et al. | |
| 8,037,653 B2 | 10/2011 | Hohmann, Jr. | |
| D660,691 S | 5/2012 | Yamazaki | |
| D663,243 S | 7/2012 | Li | |
| 8,336,275 B2 | 12/2012 | Rodenhouse | |
| D679,169 S | 4/2013 | Else | |
| D679,572 S | 4/2013 | Attaway | |
| 8,413,740 B2 | 4/2013 | Rodenhouse | |
| D682,666 S | 5/2013 | Wigboldy | |
| 8,516,763 B2 | 8/2013 | Hohmann, Jr. | |
| 8,544,182 B2 * | 10/2013 | Storjohann | E04G 21/10 |
| | | | 33/518 |
| 8,555,596 B2 | 10/2013 | Hohmann, Jr. | |
| 8,596,010 B2 | 12/2013 | Hohmann, Jr. | |
| 8,601,763 B2 | 12/2013 | Bui | |
| 8,613,175 B2 | 12/2013 | Hohmann, Jr. | |

| | | | |
|---|---|---|---|
| D696,930 S | 1/2014 | Rodenhouse et al. | |
| D696,931 S | 1/2014 | Rodenhouse et al. | |
| D696,932 S | 1/2014 | Rodenhouse et al. | |
| 8,661,766 B2 | 3/2014 | Hohmann, Jr. | |
| D702,544 S | 4/2014 | Hohmann, Jr. | |
| 8,726,597 B2 | 5/2014 | Hohmann, Jr. | |
| D706,127 S | 6/2014 | Hohmann, Jr. | |
| 9,140,001 B1 | 9/2015 | Hohmann, Jr. | |
| D744,799 S | 12/2015 | Rodenhouse et al. | |
| D748,973 S | 2/2016 | Rodenhouse et al. | |
| D749,941 S | 2/2016 | Rodenhouse et al. | |
| 9,309,915 B1 | 4/2016 | Rodenhouse et al. | |
| D755,622 S | 5/2016 | Rodenhouse et al. | |
| 9,353,515 B2 | 5/2016 | Farahmandpour | |
| 9,631,667 B2 | 4/2017 | Rodenhouse et al. | |
| D795,685 S | 8/2017 | Rodenhouse et al. | |
| 9,890,807 B1 | 2/2018 | Rodenhouse et al. | |
| 9,945,414 B1 | 4/2018 | Rodenhouse et al. | |
| 9,989,082 B2 | 6/2018 | Rodenhouse et al. | |
| 10,151,103 B1 | 12/2018 | Hohmann, Jr. | |
| 10,202,754 B2 | 2/2019 | Hohmann, Jr. | |
| 10,876,285 B1 * | 12/2020 | Wigboldy | E04B 1/4178 |
| 11,078,663 B1 | 8/2021 | Wigboldy et al. | |
| 2002/0098058 A1 | 7/2002 | Caldera | |
| 2004/0060723 A1 | 4/2004 | Pallapothu | |
| 2004/0084099 A1 | 5/2004 | Miura | |
| 2005/0207866 A1 * | 9/2005 | Attanasio | B64C 1/12 |
| | | | 411/353 |
| 2006/0171794 A1 | 8/2006 | Ordonio et al. | |
| 2007/0011964 A1 | 1/2007 | Smith | |
| 2007/0175170 A1 | 8/2007 | Shah | |
| 2008/0115439 A1 | 5/2008 | Tamlyn | |
| 2008/0145179 A1 * | 6/2008 | Amann | F16B 19/02 |
| | | | 411/378 |
| 2008/0310932 A1 | 12/2008 | McIntyre et al. | |
| 2010/0019014 A1 | 1/2010 | Rodenhouse | |
| 2010/0037552 A1 | 2/2010 | Bronner | |
| 2012/0114448 A1 | 5/2012 | Liu | |
| 2013/0247498 A1 | 9/2013 | Hohmann, Jr. | |
| 2014/0260065 A1 | 9/2014 | Hohmann, Jr. | |
| 2015/0247519 A1 | 9/2015 | Call et al. | |
| 2016/0183638 A1 | 6/2016 | Lu | |
| 2016/0215810 A1 | 7/2016 | Echito et al. | |
| 2018/0172059 A1 | 6/2018 | Hutchings et al. | |
| 2019/0093697 A1 | 3/2019 | Becker et al. | |
| 2019/0127970 A1 | 5/2019 | Hohmann, Jr. | |
| 2019/0234448 A1 * | 8/2019 | Owens, II | F16B 43/00 |

FOREIGN PATENT DOCUMENTS

| | | | |
|---|---|---|---|
| DE | 102007026733 A1 | 12/2008 | |
| EP | 1510629 A1 | 2/2005 | |
| WO | 2006114177 A1 | 11/2006 | |

OTHER PUBLICATIONS

Brochure disclosing 1-3/4" diameter Plasti-Grip® CBW washer distributed by Rodenhouse Inc. more than one year prior to Sep. 6, 2012.

Brochure disclosing 1-1/4" diameter Grip-Plate® Tab washer distributed by Rodenhouse Inc. more than one year prior to Sep. 6, 2012.

Brochure disclosing 1-1/4" diameter Grip-Plate® Plastic washer distributed by Rodenhouse Inc. more than one year prior to Sep. 6, 2012.

Brochure disclosing 2" diameter Plasti-Grip® CBW2 washer distributed by Rodenhouse Inc. more than one year prior to Sep. 6, 2012.

Brochure disclosing 1-3/4" diameter Plasti-Grip® III washer distributed by Rodenhouse Inc. more than one year prior to Sep. 6, 2012.

Brochure disclosing Plasti-Grip® PMF Plastic Masonry Fastener distributed by Rodenhouse Inc. more than one year prior to Sep. 6, 2012.

Brochure disclosing 3" diameter Grip-Lok® "Hurricane" washer distributed by Rodenhouse Inc. more than one year prior to Sep. 6, 2012.

(56) References Cited

OTHER PUBLICATIONS

Heckmann Building Products Inc.'s Catalog, Copyright 2001, Effective Jan. 2001; published in 2001.

* cited by examiner

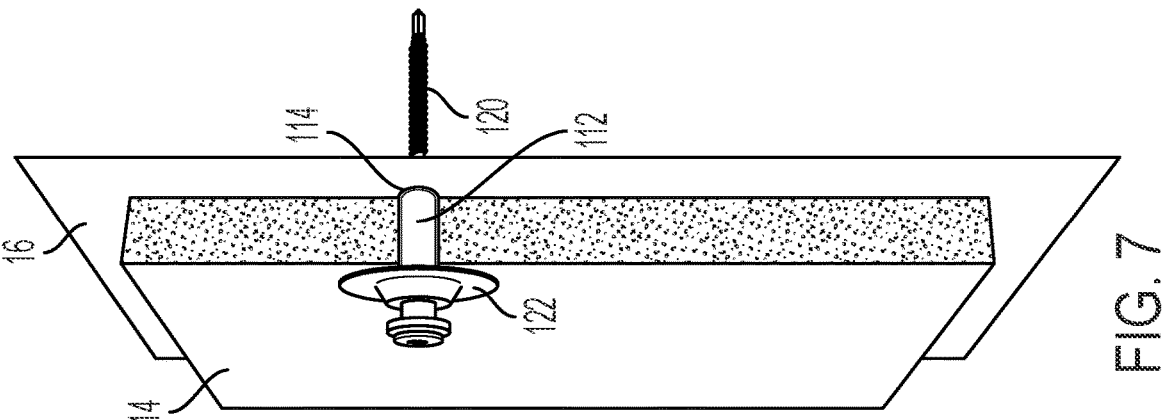
FIG. 7
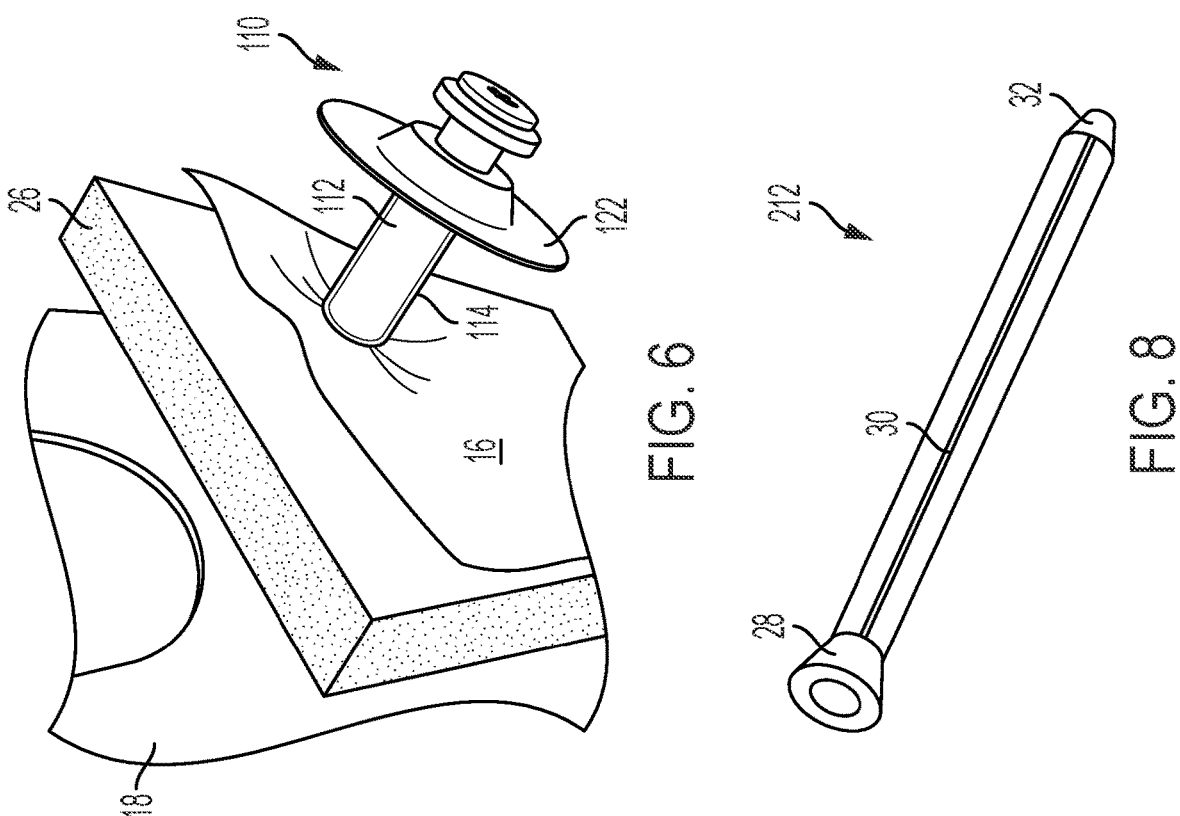
FIG. 6
FIG. 8

WALL SYSTEM FASTENER WITH SEAL MEMBER

CROSS REFERENCE TO RELATED APPLICATION

The present application is a divisional of U.S. patent application Ser. No. 16/859,764, filed on Apr. 27, 2020, now U.S. Pat. No. 11,698,095, which claims priority of U.S. provisional application Ser. No. 62/838,425 filed Apr. 25, 2019, all of which are hereby incorporated herein by reference in their entireties.

FIELD OF THE INVENTION

The present invention is directed to wall system fasteners, and in particular, toward energy efficient fasteners with seals that may be used for various applications, including for sealed securing of brick or other masonry veneers, exterior wall treatments, insulation attachments, or cladding or girt attachments, such as to insulated cavity walls.

BACKGROUND OF THE INVENTION

Fasteners are used in building construction of wall systems, including for use in securing insulation over air, water, and/or vapor barriers, including threaded fasteners, such as screws, and non-threaded fasteners, such as nails. Threaded fasteners are also used with conventional brick or masonry anchors, such as for insulated cavity walls, such as in buildings utilizing veneer brick or masonry walls or insulated rainscreen walls.

SUMMARY OF THE INVENTION

Embodiments of the present invention provide a variety of air, fluid, weather, and/or vapor sealing wall fasteners for securing or retaining components or materials to a wall system, such as layer of continuous insulation or fluid barrier and/or cladding systems. These wall fasteners include a vapor or fluid seal to provide several unique benefits. Exemplary embodiments provide a fluid or vapor barrier seal, such that fluid or vapor leakage between the fastener and a layer insulation, an air-barrier, a weather barrier, or wall substrate, is reduced or eliminated, thereby reducing damage and energy transfer through the insulation, barrier, or substrate positioned between an exterior wall treatment or cladding and an vapor or fluid barrier covered inner wall. Fluid barrier performance is also improved when the base of the fluid barrier seal compresses against the fluid barrier material. Furthermore, large diameter washers may be configured to affix to the insulation and may also compress the fluid seal with the insulation at the point of fastener penetration, and thus effectively provide a "gasket" against air and water leakage.

In one form of the present invention, a wall system fastener is provided for retaining insulation includes a mechanical fastener, such as an elongated screw, and a tube seal or gasket. The screw may be configured to secure a layer of insulation to the wall. The tube seal is configured to provide a fluid or vapor barrier between the layer of insulation and the screw. Preferably, the tube seal compresses against a layer of vapor barrier disposed with the wall system to further seal between the wall fastener and the wall system. The wall system fastener may include a washer that is configured with a central portion comprising a center hole configured for receiving the screw. The washer's central portion is configured for compressively mating with the tube seal to effectively seal the interaction point between the seal and the washer.

In another form of the present invention, a wall anchor is provided for retaining a masonry or brick veneer alongside a wall includes an elongated tubular shank, a tube seal or gasket, and a washer. The shank is configured to provide a space for a layer of insulation between the brick veneer and the wall. The shank comprises a center bore running down the length of the shank and is configured for receiving a screw through the bore for securing the wall anchor to the wall. The shank also includes a pair of flanges positioned on a proximal or non-penetrating end of the shank. The pair of flanges are configured to form a groove between them. The tube seal is configured to provide a fluid or vapor barrier between the layer of insulation, the shank, and the washer. Preferably, the tube seal compresses against a layer of vapor barrier disposed with the wall system to further seal between the anchor and the wall system. The washer is configured with a central portion comprising a center hole configured for receiving the shank. The washer's central portion is configured for supporting the pair of flanges when the screw is inserted into the wall. The washer's central portion is configured for compressively mating with the tube seal to effectively seal the interaction point between the seal and the washer. Optionally, the wall anchor further includes an angled wire tie installed on the anchor to secure the veneer to the wall system. The angled wire tie includes a narrow portion configured to be retained by the groove. The angled wire tie is configured for inserting between rows of masonry of the brick, masonry, or stone veneer.

In one aspect, the length of the tube seal is chosen to be substantially equal to the thickness of the insulation such that the tube seal compresses against the substrate beneath the insulation. In another aspect, the length of the shank is chosen to be substantially equal to the thickness of the insulation such that the shank compresses against the substrate beneath the insulation. In yet another aspect, the length of the shank is chosen to be equal to the combined thickness of the insulation and a wall board, such as gypsum sheathing, such that the shank passes through the wall board. When the length of the shank equals the thickness of the insulation and the wall board, the length of the tube seal is substantially equal to the thickness of only the insulation, such that the tube seal does not pass through the wall board and compresses against the vapor, weather, and/or fluid barrier on the surface of the wall board.

In one aspect of the present invention, the tube seal comprises a non-metallic material, and may be configured as a resilient and flexible material configured to compress between the anchor and the insulation. In the case of a resilient and flexible tube seal, the material may be polyvinyl chloride, polyurethane, or similar semi-rigid and resilient polymer or co-polymer. The tube seal may be formed from injection molded polymers or from extruded polymer tubing. The tube seal comprises a center bore running down the length of the tube and is configured for receiving the screw or the shank of the anchor through the bore.

In one aspect of the present invention, the tube seal includes a conical, funnel, or bugle tip at one of its ends that provides additional surface area to seal the interaction point between the washer and the seal. Optionally, fins, ribs, or supports are formed along the tube seal to rotationally engage the tube seal with the insulation to reduce spinning of the tube seal during installation of the anchor through the insulation. In one aspect, the tube seal includes a tapered or pointed tip at an end opposite the washer to provide reduced obstruction on the tube seal as it passes through the insulation during installation.

Thus, masonry veneers, insulation attachments, or cladding or girt attachments may be retained by the wall fasteners of the present invention, such as retaining a layer of insulation to a wall. The wall fasteners provide improved thermal insulation by resisting fluid and vapor flow between the fastener and the insulation or wall material. The wall fasteners may be used to secure various types of wall components, treatments, or veneers to a wall system, including wall systems having rigid or flexible insulation, vapor, fluid, and/or weather barriers, wall boards, or the like.

These and other objects, advantages, purposes and features of the present invention will become apparent upon review of the following specification in conjunction with the drawings.

BRIEF DESCRIPTION OF THE DRAWINGS

FIG. 6 is a perspective view of the wall fastener of FIG. 4, with the wall fastener disposed in a wall system;

FIG. 7 is a partial sectional perspective view of the wall fastener of FIG. 1 depicting a compressed tube seal;

FIG. 8 is a perspective view of a flanged, conical, funnel, or bugle end seal for wall fasteners in accordance with the present invention;

DESCRIPTION OF THE PREFERRED EMBODIMENTS

Figures 1, 1A, 2:
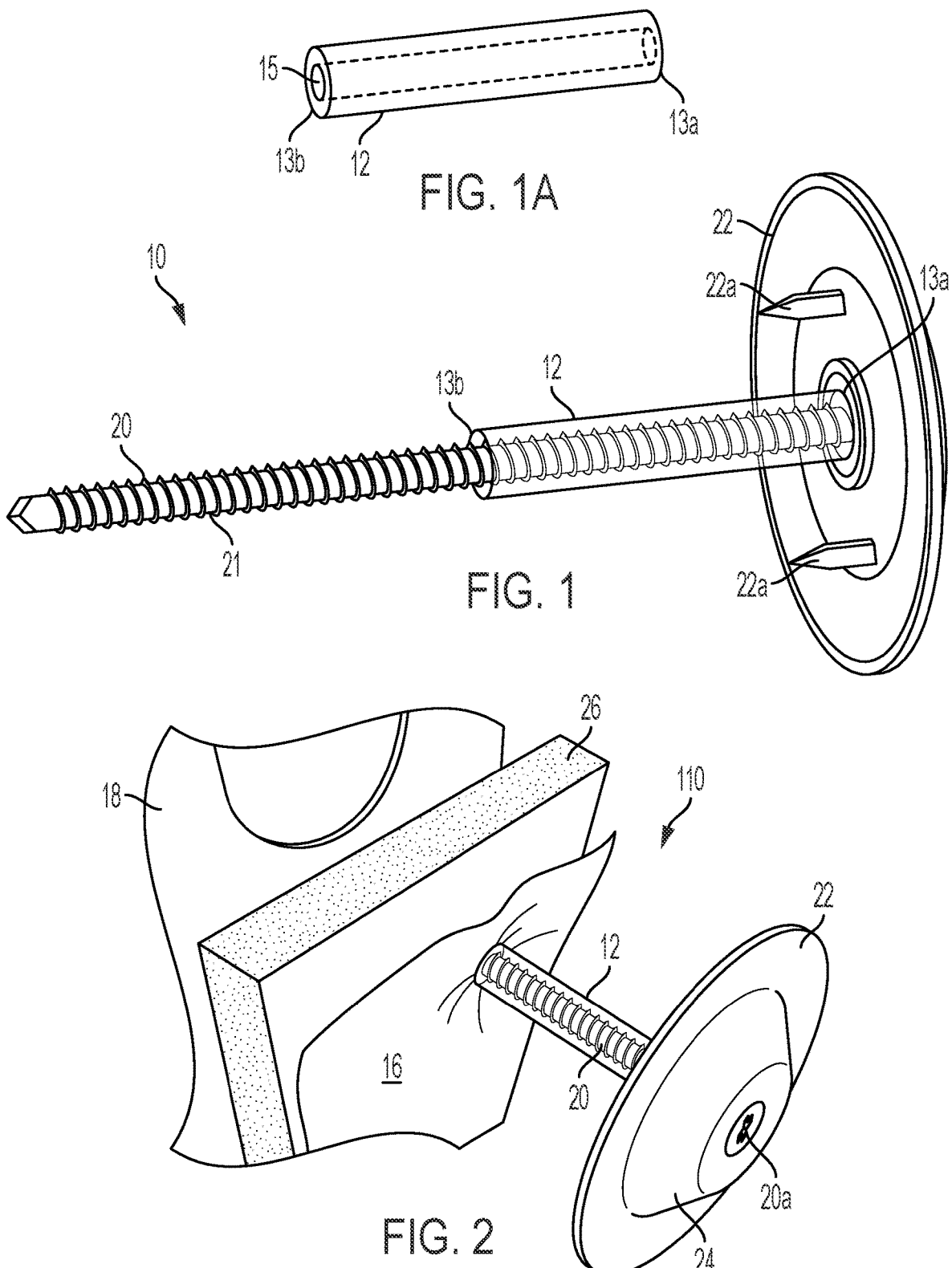
FIG. 1 is a perspective view of a wall fastener assembly with tube seal in accordance with an aspect of the present invention.
FIG. 1A is a perspective view of the tube seal removed from the wall fastener assembly of FIG. 1.
FIG. 2 is a perspective view of the wall fastener of FIG. 1 disposed in sealing contact with a barrier layer configured as a fluid, vapor, and/or weather barrier.

Referring to the drawings and the illustrative embodiments depicted therein, an exemplary wall fastener or fastener system with tube seal or tube gasket may be implemented in any one or more of the illustrative embodiments discussed herein. The wall fasteners with tube seal of the present invention can provide for a variety of improvements and benefits. For example, leakage prevention performance is improved because the base of an exemplary tube seal or gasket compresses on a barrier material disposed behind insulation. The tube seal also provides a thermal break or disruption of thermal transmission through the metallic components of a wall system and the wall fastener. Furthermore, as described herein, the wall fasteners may include exemplary large diameter washers that are configured to compress the tube seal or gasket seal to further inhibit leakage at the interface with the washer. No additional sealing of the fasteners is required before, during, or after installation of the wall fastener with tube seal, thereby reducing building costs, improving efficiency of construction, and increasing sustainability of a building envelope. While the wall fastener with tube seal is particularly useful for securing insulation to a wall system having a fluid barrier, the wall fastener with tube seal may be adapted for use with various wall systems, wall system components, cladding systems, material types, and fastener arrangements, such as stucco/plaster, masonry, cladding channels, brick anchors, and brick ties, for example.

Figure 3:
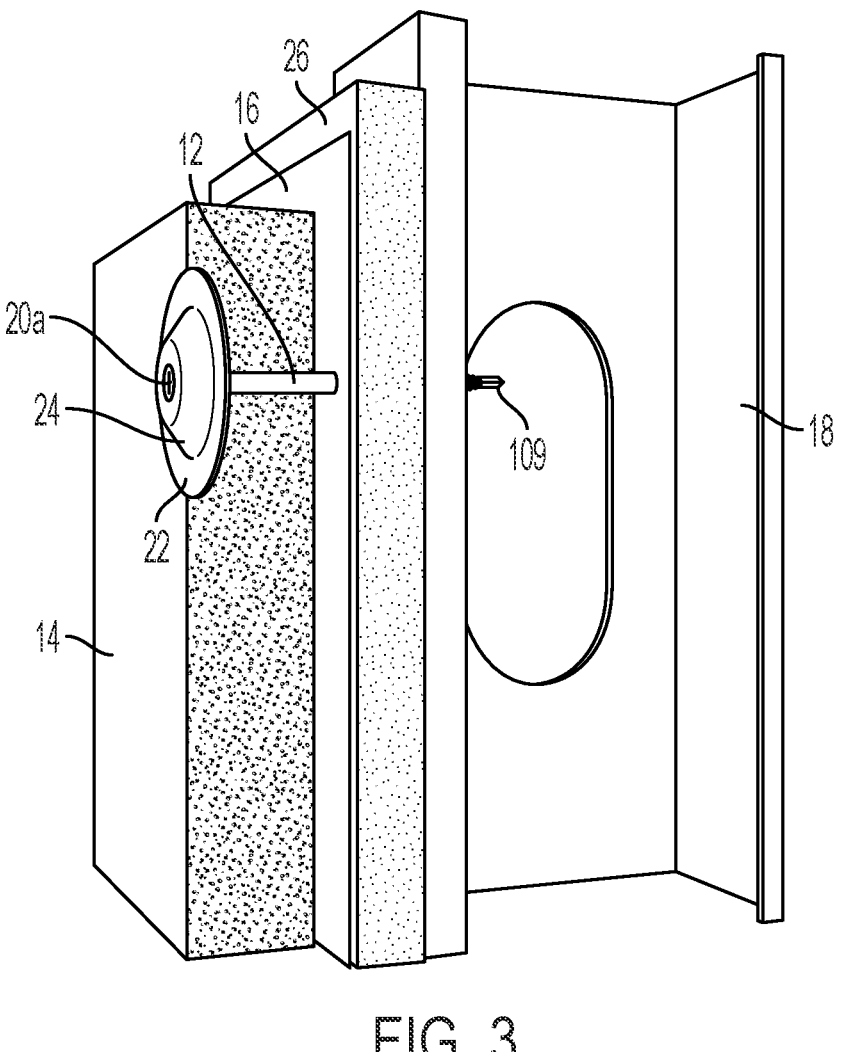
FIG. 3 is a partial sectional perspective view of the wall fastener of FIG. 1, with the fastener disposed in a section of a wall system.

Referring to FIGS. 1-3, an exemplary wall fastener or fastener assembly 10 including a fluid or tube seal or gasket member 12 is illustrated for use in retaining a wall system component, such as a layer of insulation 14 or other wall system material commonly installed in building walls. As shown in the illustrated wall system configuration embodiment of FIG. 3, the wall fastener 10 is configured for retaining a layer of insulation 14 to an inner wall that is covered with a barrier layer 16, such as an air or fluid barrier, and provides a fluid seal between the fastener 10, insulation 14 and barrier 16. In particular, one end 13a of seal member 12 seals against the underside of the washer 22 while the opposite end 13b of seal member 12 seals against the barrier layer 16, with the head 20a of fastener 20 sealing against the opposite side of washer 22 from end 13a. Fastener assembly 10 thereby secures insulation layer 14 in place while inhibiting fluid and/or air from penetrating beyond barrier layer 16 to thereby provides both a vapor and thermal barrier, despite fastener 20 piercing through barrier layer 14 during assembly, and may be employed not only for securing insulation, but also for use with various wall systems, including cladding support systems such as channels or brackets for mounting cladding, including for vinyl siding, lathe applications, and the like.

The insulation layer 14 may be one of various types of insulation, such as a rigid or semi-rigid, batt or matt type of insulation, including extruded polystyrene (XPS), expanded polystyrene (EPS), polyisocyanurate (polyiso), mineral wool, or other type of insulation. The barrier layer 16 may be one of various types of fluid and/or air barriers, including fluid applied, peel-and-stick adhered membrane, sheet-applied membrane, or weather resistant barrier (WRB) panel. Such inner wall assemblies may be formed from one or more of steel or wooden studs or framing members 18, along with masonry, plywood sheathing, or gypsum sheathing overlays 26. As illustrated in FIG. 3, wall fastener assembly 10 with washer 22 retains insulation layer 14 in place, with seal 12 inhibiting air and/or fluid from passing beyond barrier layer 16, and with seal 12 controlling the depth to which fastener 20 penetrates into the wall assembly via seal 12 contacting barrier layer 16, which in turn is disposed against the rigid sheathing overlay 26. As further understood from the embodiment illustrated in FIG. 3, fastener 20 penetrates through sheathing overlay 26 and into stud 18.

The tube seal 12 is formed from a non-metallic material, such as in one embodiment a semi-rigid material, such as flexible polyvinyl chloride, a polyurethane, or a similar polymer or co-polymer. Seal 12 in the illustrated embodiment is an ether based polyurethane material. Optionally, the tube seal 12 may be injection molded or extruded and include properties such as UV inhibition, high and low temperature resiliency, and compression resiliency. The seal 12 is sufficiently rigid or stiff so as to burrow or press through the insulation 14 as the fastener 10 is being installed, without the need to pre-drill a hole through the insulation 14 and without substantial deformation or collapsing of the seal 14 until the seal contacts the barrier layer 16 that is supported against the sheathing overlay 26, and is compliable so as to slightly compress during installation. That is, upon fastener 20 penetrating the wall assembly sufficient such that the seal 12 is slightly compressed between the underside of washer 22 and against barrier layer 16 supported on sheathing overlay 26, seal 12 will slightly compress but inhibit fastener 20 from penetrating further into wall assembly when being torqued at a reasonable value by increasing the resistance to further torquing. Alternatively, a tube seal for use in particular implementations of the present invention may be a rigid plastic, with the tube seal still being operable to provide a seal at either end.

In the embodiment of FIGS. 1-3, seal 12 is substantially tubular or cylindrical in shape, with an elongate length or body relative to its circular cross section. As best illustrated in FIGS. 1, 1A, and 2, the fluid seal 12 includes a center bore 15 running down the length of the seal 12 whereby seal 12 has a wall thickness defined by its outside diameter and the inside diameter of bore 15. Bore 15 is configured for receiving an elongate mechanical fastener, such as a threaded fastener or screw 20, where fastener 20 includes a shaft 21 that is longer than the length of seal 12. Various forms of fasteners may be used in connection with the present invention, including fasteners of differing lengths, diameters, pitches, head formats and styles. While the illustrated embodiments depict a threaded fastener, the tube seal 12 may be disposed on a non-threaded fastener, such as a nail or pin which may be hammered manually or shot automatically through bore 15 and into the wall system. In the illustrated embodiment, the wall fastener assembly 10 also includes a washer 22 with a raised annular ridge or rim portion 24 surrounding a central annular region configured to receive the screw 20.

As illustrated in FIG. 2, when the screw 20 of the wall fastener 10 is tightened, the bottom end 13b of the tube seal 12 compresses on the barrier layer 16 to effectively seal the penetration of the screw 20 through the barrier layer 16 and thereby inhibit air and water from entering bore 15 at end 13b. At the same time, the top end 13a of the tube seal 12 compresses on the underside of the washer 22 to effectively seal against the washer 22 to thereby inhibit air and water from entering bore 15 at end 13a. The underside of the washer 22 includes a central flat surface against which the tube seal 12 compresses. The friction created as the fastener 20 is tightened and the tube seal 12 is compressed between the barrier 16 and the washer 22 limits or stops the tube seal 12 from spinning. The screw 20 may continue to be tightened further once the seal 12 is no longer spinning, or at least spinning less than the rotation of the fastener 20 itself. The limiting or stopping of the spinning of the tube seal 12 minimizes or eliminates frictional damage to the insulation 14, and in particular minimizes friction and damage to the barrier layer 16 as the wall fastener 10 is installed. That is, barrier layer 16 may be a membrane or film susceptible to tearing. Accordingly, the limiting of the rotation of the tube seal 12 when in contact with the barrier layer 16 aids in preventing such damage, where a seal that is integral with the rotating fastener will tend to burrow/burn through the barrier layer 16. Because the exemplary tube seal 12 compresses on the barrier layer 16 material and seals the penetration point in the barrier layer 16, the barrier's performance will be improved.

When the wall fastener assembly 10 with the seal 12 is installed through a section of insulation 14, the assembly 10 supports the insulation layer 14 and seal 12 prevents leakage in and around insulation 14 from entering the wall fastener assembly 10. Once the screw 20 has been driven through the barrier layer 16 and into the substrate, the driven side of the screw head 20a will be tightly pressed against the washer 22, and effectively seal against air and water penetrating at the screw 20 and washer 22 interface, in particular between the screw head 20a and washer 22 and between the end 13a of seal 12 and bottom side of washer 22.

Washer 22 includes an upper surface and a lower surface, with the upper surface including a chamfered or angled opening disposed about the through hole in washer 22, where the chamfered opening is configured to receive screw head 20a, and where the underside of screw head 20a correspondingly is angled such that screw head 20a is able to seat within the chamfered opening to thereby form a seal there against. In particular, washer 22 may be constructed in accordance with the washers disclosed in U.S. Pat. No. 9,309,915, which is incorporated herein by reference in its entirety. Accordingly, optionally as shown in the illustrated embodiment of FIG. 1, the washer 22 may be constructed of a plastic material and include prongs or spiked projections 22a configured to grab or bite into the insulation 14 to reduce spinning of the washer 22 during installation. It should be appreciated, however, that numerous alternative forms of washers may be employed with the present invention, including depending on the type of wall assembly being constructed. For example, plastic washers without prongs may be used, including plastic washers with alternative configurations, including in constructions in which a barrier layer 16 is employed. Still further, washers constructed of metal may be employed. Without limitation, washers that may be used in connection with the present invention includes washers provided by Rodenhouse Inc. of Grand Rapids, Michigan, including THERMAL-GRIP, PLASTI-GRIP, and GRIP-PLATE brand washers.

Figures 4, 5:
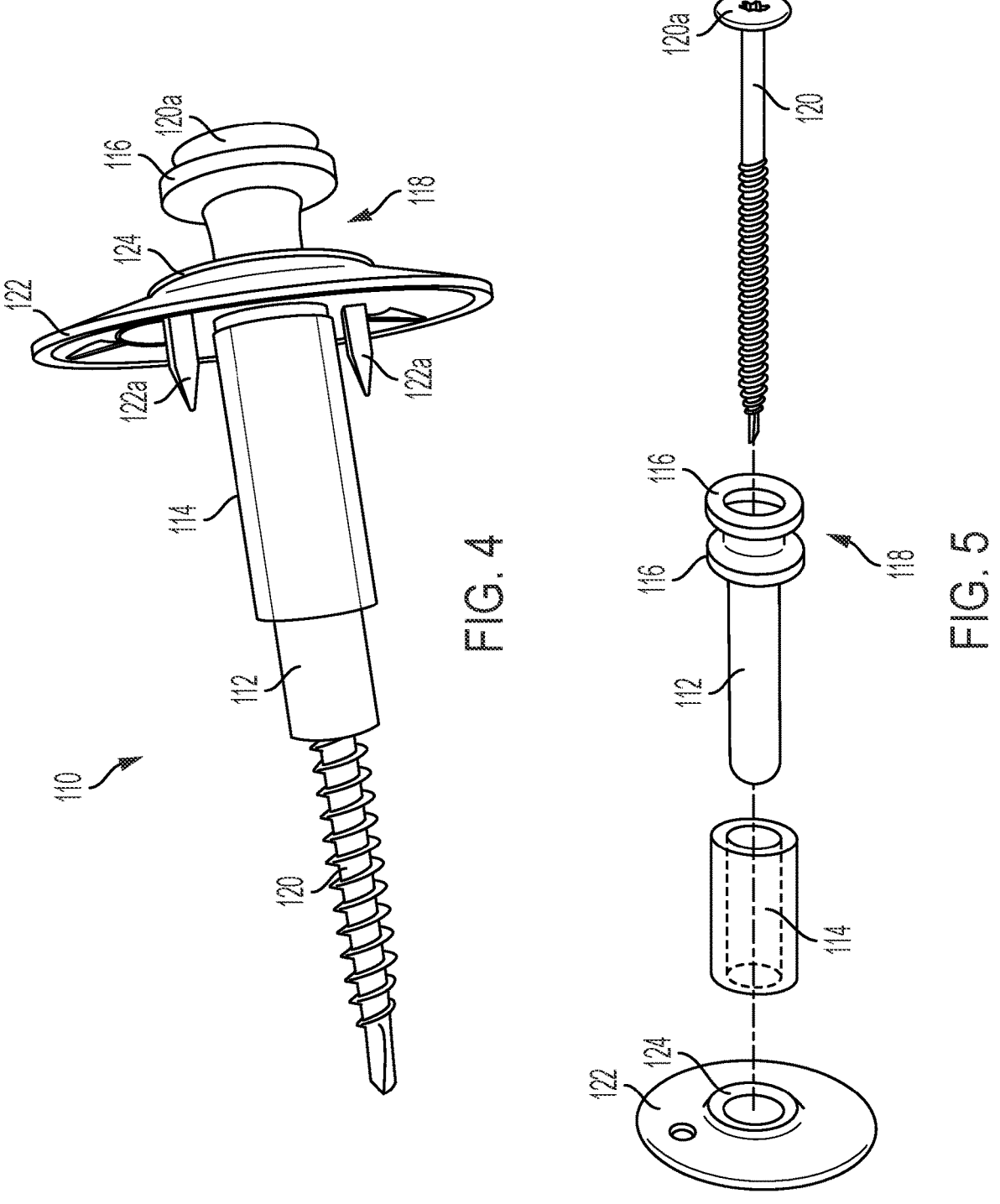
FIG. 4 is a perspective view of another embodiment of a wall fastener configured as a wall anchor with tube seal in accordance with another aspect of the present invention.
FIG. 5 is an exploded perspective view of the wall anchor of FIG. 4.
Figure 9:
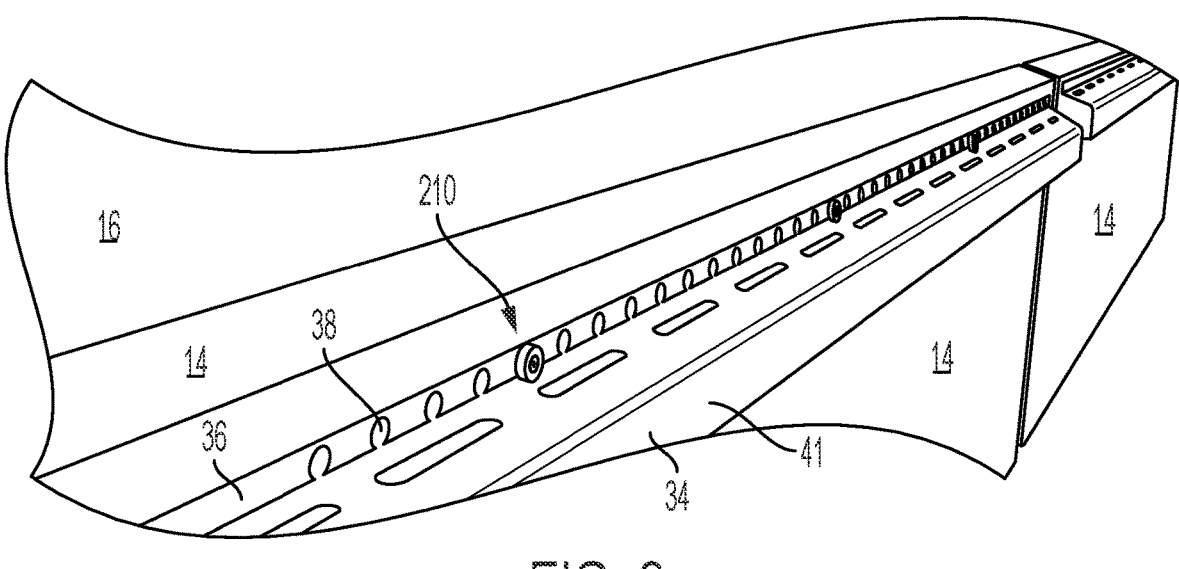
FIG. 9 is a perspective view of a wall system having a hat channel fastened to a section of insulation with a wall fastener with a tube seal in accordance with a further aspect of the present invention.
Figure 10:
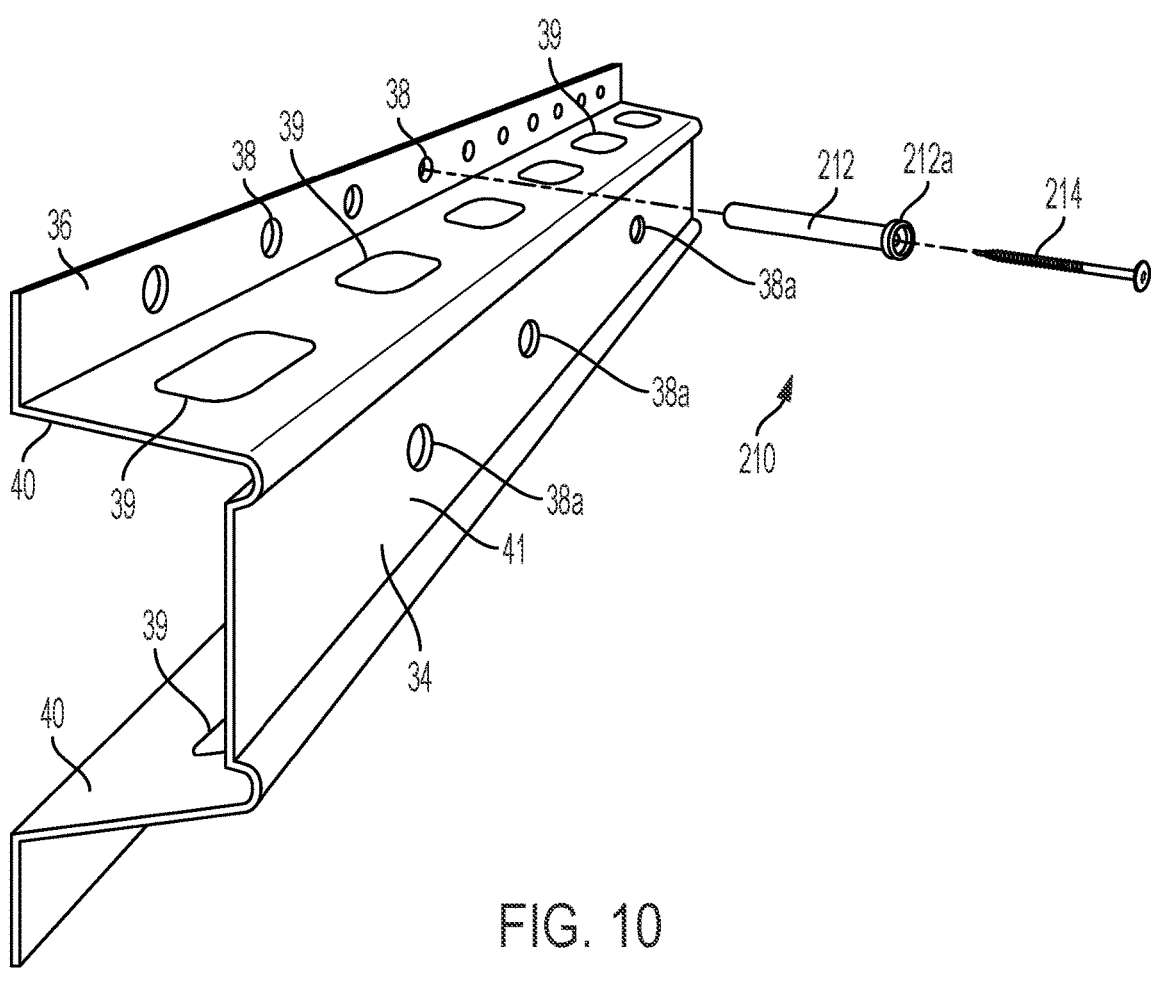
FIG. 10 is an exploded perspective view of the hat channel and wall fastener of FIG. 9.

In the illustrated embodiment of FIGS. 4-6, an alternative wall fastener assembly configured as a wall anchor 110 includes a shank 112 with a tube seal 114 disposed on the shank 112. The shank 112 includes a pair of generally disc-like flanges 116 disposed on a proximal or non-penetrating end of the shank 112 and forming an annular groove 118 therebetween. An exemplary shank 112 is described in commonly assigned U.S. patent application Ser. No. 16/661,438 filed Oct. 23, 2019, which is hereby incorporated herein by reference in its entirety. The shank 112 may be formed of resinous plastic with an elongated tubular construction, with a center bore running down the length of the shank 112 and configured for receiving a large diameter flat head mechanical fastener, such as a threaded fastener or screw 120 (FIGS. 4-5). The wall anchor 110 includes a washer 122 similar to the washer of embodiment 10, however washer 122 has a larger opening diameter configured for receiving the shank 112 and includes an annular raised rim 124 configured to receive a flange 116 of the shank 112. The washer 122 includes spiked projection 122a to secure the washer 122 into the insulation 14. Optionally, an alternative wall anchor replaces the washer with a large diameter disc-like flange that takes the place of the inner flange 116 formed on the shank 112. The optional large diameter flange takes the place of the washer 122 and performs substantially the same function.

As illustrated in FIG. 6, the wall anchor 110 is depicted installed in a wall system with an insulation layer omitted to illustrate how the shank 112 and fluid seal 114 of the wall anchor 110 butt up against the air barrier 16 covering the wall. A partial sectional illustration of the wall anchor installed through an insulation layer 14 is depicted in FIG. 7. The fluid seal 114 may be shorter than the shank 112 such that the fluid seal 114 butts up against the air barrier 16 with the shank 112 continuing through the air barrier 16 and wall board or gypsum 26 to bottom out on the stud 18. The length of the shank 112 and seal 114 may be selected to match a thickness of insulation 14 and wall board or gypsum 26. When the length of the seal 114 matches the insulation 14 thickness, the seal 114 will "bottom out" on the surface of the barrier layer 16 covering the wall. By "bottoming out" the seal 114 on the surface of the air barrier 16, the hole created by the screw 120 when it passes through the air barrier 16 will be covered by the bottom of the tube seal 114, and the hole created by the shank 112 through the wall board will also be covered by the seal 114. As best illustrated in FIG. 6, when the screw 120 of the wall anchor 110 is tightened, the bottom of the tube seal 114 compresses on the air barrier 16 to effectively seal the penetration against air and water.

As illustrated in FIG. 6, the wall includes studs 18 and an overlayer of exterior gypsum sheathing 26. While the illustrated embodiment includes studs 18 and gypsum sheathing 26, the wall anchor may be utilized with various types of wall systems, such as having a layer of insulation and a layer of air-barrier mounted to the face of a masonry wall. Optionally, in scenarios where a layer of gypsum sheathing 26 is disposed between the studs 18 and the air barrier 16, the tube seal 114 may be shorter than the length of the shank 112 by a distance that is substantially equal to the thickness of the gypsum sheathing 26 (FIG. 4). In this optional embodiment, the rigid barrel of the shank 112 cuts through and extends through the layer of gypsum sheathing 26 to bottom out on the stud 18, while the seal tube 114 compresses against the face of the air barrier 16, as well as the underside of the washer 122. This ensures an air and water tight seal between the anchor 110 and the wall system and its various components. Although illustrated with a particular configuration of brick anchor or wall anchor 110, it should be appreciated that the present invention may be employed with alternatively configured such anchors, including brick or wall anchors produced by various manufacturers. In such embodiments tube seal 114 is disposed over the shank of the wall anchor to provide a seal against a barrier layer at one end and against a washer portion of the wall anchor at the opposite end.

Referring to FIG. 8, an alternative tube seal 212 may include a flanged or conical or funnel or bugle end 28. The bugle end 28 provides increased surface area to ensure effective sealing between the tube seal 212 and either the washer 22 or the screw head 20a. The tube seal 212 of FIG. 8 may be configured for use with wall anchor 110 as well. Optionally, outwardly extending ridges 30 along the barrel of the tube seal 212 are provided to reduce the incidence of seal rotation during installation while the threaded fastener 20 is being driven, which may reduce damage to the insulation 14 and/or barrier layer 16 material. Optionally, the barrier layer 16 end of the tube seal 212 includes a pointed or tapered tip 32 to assist the tube 212 in passing through a layer of foam insulation 14. In the illustrated embodiment the end 28 is shown as being angled. In an alternative arrangement, however, a tube seal having a flanged end may be angled such as at a ninety-degree angle. In such an arrangement the underside of the flange is perpendicular to the elongate length of the tube seal, and the upper side of the flange is generally parallel with the underside of the flange. Such a flanged end may be employed with any of the tube seals as disclosed herein.

Referring to FIGS. 9-12, and the embodiments illustrated therein, a wall fastener assembly 210, similar to fastener assembly 10 is illustrated in connection with a channel or bracket for mounting cladding systems, such as for vinyl siding, lathe applications, or the like. In the illustrated embodiment a hat channel 34 is assembled to a wall system on the exterior side of a layer of insulation 14, such as may be used for securing a cladding channel or girt system. The wall fastener 210 includes a tube seal or gasket 212 similar to tube seal 12. The tube seal 212 is configured to receive an elongate mechanical fastener, such as a threaded fastener or screw 214 through a central bore through the tube seal 212. The hat channel 34 includes a pair of mounting flanges or portions 36 that are configured to mount substantially flat along the face of the insulation layer 14. The mounting flanges 36 include a plurality of holes 38 spaced uniformly along the length of the flanges 36 to provide locations for receiving the fastener assemblies 210 for securing to the wall assembly. The elongate outer edges of the flanges 36 may be chamfered, rounded or cased so as to inhibit tearing of insulation layer 14. The hat channel 34 additionally includes a plurality of holes 39 along the elongate legs 40 that provide locations for drainage or ventilation as necessary. For example, the holes 38 may be uniformly spaced at one inch (1") intervals along the flange 36. The hat channel 34 provides a location at which additional cladding or building materials can be secured to the wall system, such as to elongate face 41 of channel 34, or to legs 40.

Figures 11A, 11B:
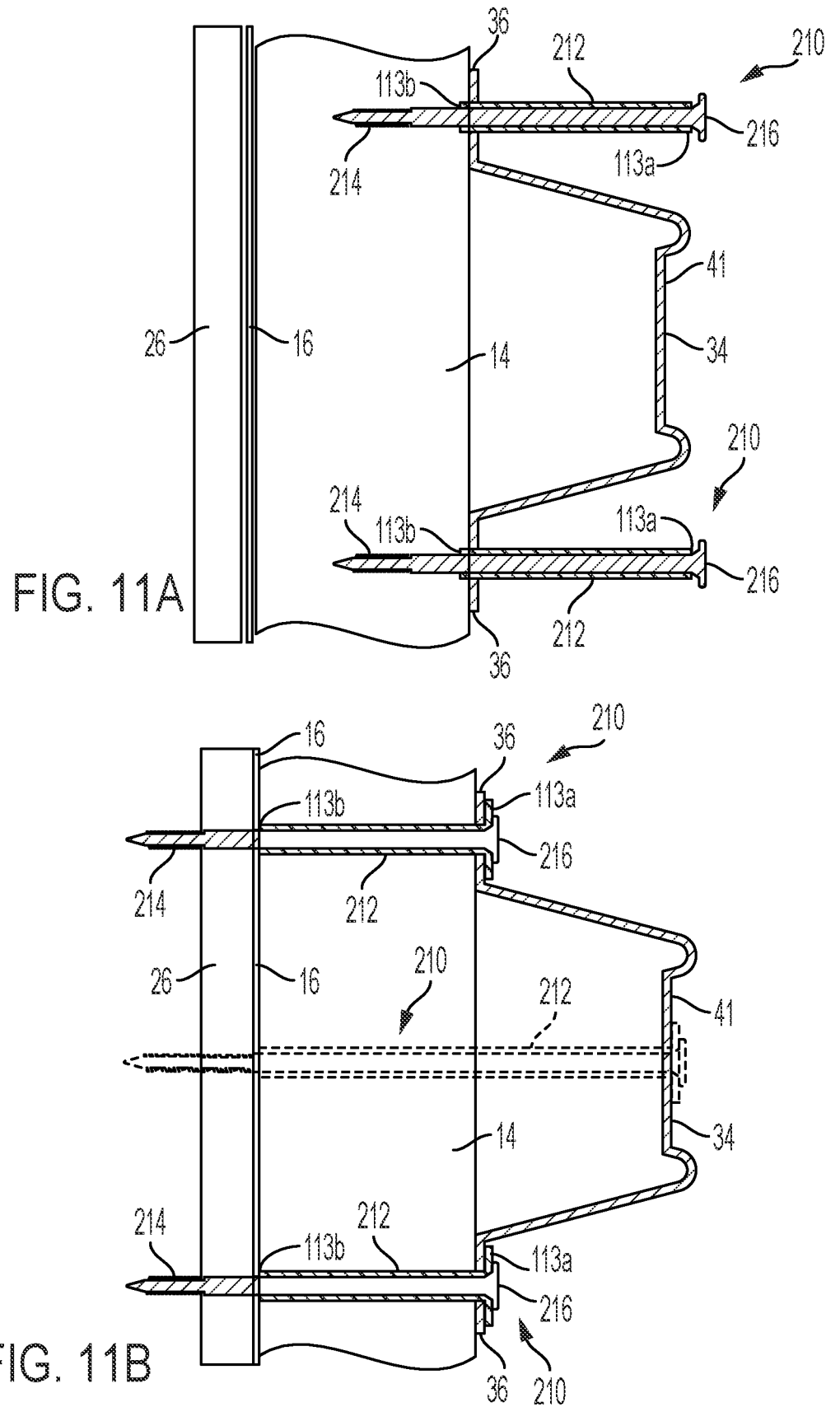
FIGS. 11A-11B are cross sectional side views of the wall fastener and hat channel of FIG. 9 depicting a sequence of installation of the wall fastener.
Figure 12:
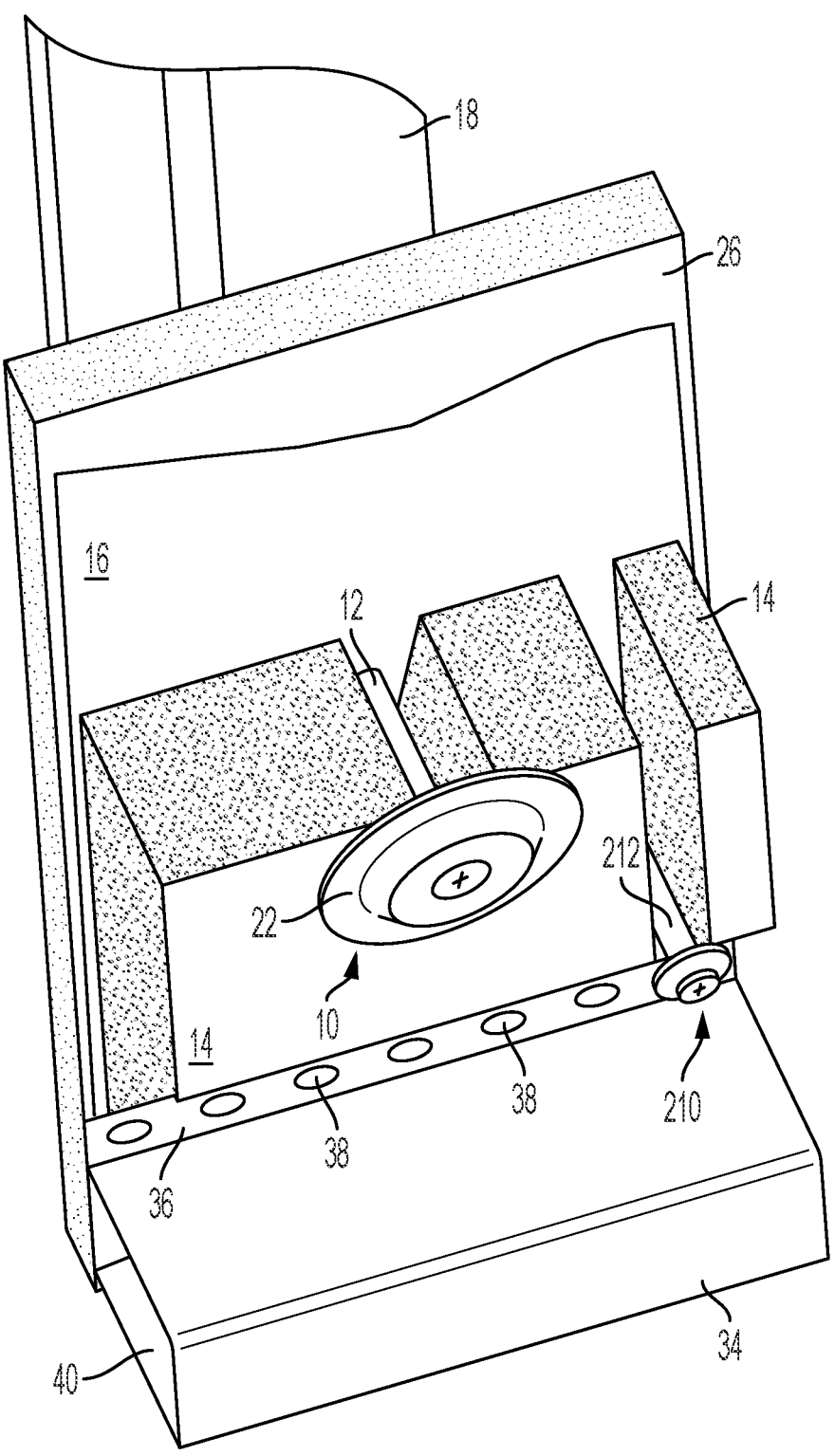
FIG. 12 is a partial sectional perspective view of a wall system including the wall fastener of FIG. 1 and the wall fastener and hat channel of FIG. 9.

The tube seal 212, as best illustrated in FIGS. 11A-11B, has an outer diameter that is somewhat smaller than the diameter of holes 38 such that the tube seal may freely pass through the holes 38 while installing the wall fastener 210 through the hat channel 34, as sequentially depicted in FIGS. 11A-11B. The seal 212 has a length that is somewhat longer than the thickness of the insulation layer 14. For example, the seal 212 may be one-eighth of an inch (⅛") longer per inch of insulation thickness provided, e.g. for a two inch (2") thick insulation layer, the seal 212 length would be two and one-quarter inch (2.25"). As such, when the screw 214 is tightened into the wall system, such as through a barrier layer 16, a layer of gypsum sheathing 26 and into a stud (not shown in FIGS. 11A and 11B), the tube seal 212 contacts or "bottoms out" against the barrier layer 16 (FIG. 11B). When the end 113b of seal 212 contacts the barrier layer 16, a portion of the seal 212 at end 113a remains and extends beyond the face of the insulation 14 and the flange 36 of the hat channel 34. As the screw 214 is tightened further, the seal 212 is compressed between the head of the screw 216 and the fluid barrier 16 and gypsum sheathing 26 (FIG. 11B). As such, the fluid barrier end 113b of the seal 212 forms a seal with the fluid barrier 16. And, as the seal 212 is compressed, the seal end 113a expands and/or conforms to the taper or form of the underside of the screw head 216 and forms a seal between the flange 36 and the screw 214. Optionally, the seal 212 may include a pre-formed tapered end 212a (see FIG. 10) configured to receive and seal against the screw head 216, similar to the seal 12 shown in FIG. 8. The portion of the seal 212 that is compressed between the screw head 216 and the flange 36 provides a thermal break or interruption of thermal transfer between the metallic materials of the screw 214 and hat channel 34 thereby reducing energy costs associated with the wall system. Although FIGS. 9-11B illustrate channel 34 being installed in a horizontal manner, it should be appreciated that channel 34 may alternatively be mounted in a vertical manner. In such an arrangement, due to the narrow width of the vertical studs, mounting holes 38a may be applied to face 41, such as for example spaced six inches apart. A fastener assembly 210 is then applied through face 41. As shown in FIG. 11B in dashed lines, such an alternative fastener assembly 210 includes a longer fastener and tube seal such that the tube seal extends beyond the surface of the insulation layer 14 such as, for example but not limited to, by around 0.875 to 1.5 inches.

It should also be appreciated that alternative channels or brackets may be employed, as well as alternative fastener assemblies, including for alternative cladding systems. For example, although channel 34 is shown as a hat channel having two flanges 36, alternative channels or brackets may be C-shaped and/or include one or more than two mounting flanges. Moreover, in the case of a vinyl siding assembly, a fastener configured as a roofing style nail having a flat head may be employed wherein the tube seal passes through a mounting opening in the upper flange of the vinyl siding panel, with the underside of the flat head nail sealing directly against the tube seal. Likewise, a flat head nail may be used with securing lathe, and a nail gun may be used for applying nails in vinyl siding, lathe or other such cladding configurations. Still further, in further embodiments a washer, such as either a plastic or metallic washer may be utilized with a bracket or channel for a cladding system. Alternatively, the fastener for use with the tube seal may include a bonded gasket, such as disposed beneath the head of the fastener, with the gasket then compressing against the end of the tube seal. Moreover, in selected embodiments the tube seal is slightly longer than the thickness of the insulation layer, as discussed above. In alternative embodiments, the tube seal may be equal to the width of the insulation layer. Still further, in particular embodiments when employed with a washer, the washer may include a central extending portion on the underside of the washer against which the tube seal end engages. In such a case, the extending portion of the washer may be recessed below the surface of the insulation layer, in which case the tube seal would be constructed to be slightly less than the thickness of the insulation layer. Accordingly, as intended herein, unless specifically stated, a tube seal that has a length that is approximately equal to the width of the insulation layer means that the tube seal may be slightly longer, such as by about 0.125 inches for every inch of thickness of insulation, or is equal to the thickness of the insulation, or is shorter than the thickness of the insulation based on the engagement with the underside of a washer for use with the tube seal.

Accordingly, the wall fastener with tube seal provides a cost and energy efficient fastener for securing wall system components, such as vapor barriers, layers of insulation, and cladding channels to a wall. The fastener with tube seal secures the component or material the wall and forms a seal at the penetration(s) made by the fastener through the component or material to seal against air, liquid, or other fluids from leaking through the penetrations. The wall fastener may include as washer and/or flared or contoured ends on the tube seal to facilitate tight seals at the penetrations. The tube seal may be configured to receive a screw or a rigid shank that is further configured to receive the screw. A washer may be provided with the wall fastener to provide additional seal as necessary depending on the material which the wall fastener is securing and retaining on the wall. The tube seal also provides a thermal break or interruption in thermal transmission when disposed between metallic components of the wall fastener or wall system.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A wall anchor system comprising: a wall anchor, said wall anchor comprising a screw configured to secure said wall anchor to a wall; said wall anchor further comprising a unitary single piece elongated, semi-rigid, non-metallic tubular seal having a center bore extending along a length of said tubular seal and configured for receiving said screw; and said wall anchor system further comprising a channel disposed alongside the wall and secured to the wall by said wall anchor, wherein said channel comprises an aperture through which said wall anchor is disposed; wherein said tubular seal is configured to compress at one end against the wall and at the opposite end between and in contact with an underside of a head of said screw and a portion of said channel proximate said aperture wherein said aperture is disposed at a mounting flange of said channel, and wherein a portion of said tubular seal extends beyond an outer surface of said mounting flange of said channel such that as said screw is tightened into the wall said tubular seal compresses between the outer surface of said mounting flange and the underside of the head of said screw thereby creating a seal at the interface of the underside of the head of said screw and said tubular seal and creating a thermal break between said tubular seal and said mounting flange.

2. The wall anchor system of claim 1, wherein said screw is longer than said tubular seal.

3. The wall anchor system of claim 1, wherein said aperture comprises a round hole for receiving said tubular seal and screw, and wherein the hole has a diameter that is larger than a diameter of said tubular seal.

4. A wall fastener assembly for a wall system comprising:
   a fastener having a shaft and a head, the fastener configured to be secured to the wall system;
   a unitary single piece elongated, semi-rigid, non-metallic seal member having a first end and a second end opposite the first end, wherein the seal member includes a center bore extending along a length of the seal member and is configured for receiving the shaft of the fastener; and
   a bracket comprising a flange with a hole through which the fastener and the tubular seal are disposed;
   wherein the wall system comprises an insulation layer disposed against a base layer with the flange of the bracket being disposed at a surface of the insulation layer opposite the base layer, and wherein when the fastener is secured to the wall system the seal member extends through the insulation layer with the first end of the seal member compressed against the base layer to form a first seal at the base layer and the opposite second end of the seal member extends out of the hole in the flange, and wherein the second end of the seal member is compressed between and contacts both the flange and the head of the fastener when the fastener is secured to the wall system to form a second seal.

5. The wall fastener assembly of claim 4, wherein the fastener is longer than the seal member, and wherein the seal member is longer than a thickness of the insulation layer.

6. The wall fastener assembly of claim 4, wherein the fastener comprises a screw.

7. The wall fastener assembly of claim 4, wherein the base layer comprises a rigid layer and a barrier layer with the barrier layer disposed between the rigid layer and the insulation layer, and wherein the first end of the seal member is compressed against the barrier layer to form the first seal with the fastener extending through the barrier layer and engaged with the rigid layer.

8. The wall fastener assembly of claim 4, wherein the flange comprises a plurality of holes and wherein the wall fastener assembly comprises a plurality of fasteners and seal members disposed within the holes for forming first seals at the base layer and second seals at the flange.

9. The wall fastener assembly of claim 8, wherein the bracket comprises a channel with the channel comprising an additional flange having holes such that the channel comprises a pair of spaced apart flanges.

10. The wall fastener assembly of claim 9, wherein the channel comprises a hat channel.

11. A wall fastener assembly for a wall system comprising:

a plurality of wall anchors, wherein each wall anchor comprises a fastener and a seal member, with the fastener comprising a shaft with threads and a head and with the fastener being configured to be secured to the wall system, and with the seal member comprising a unitary single piece elongated, semi-rigid non-metallic seal members having a first end and a second end opposite the first end and a center bore extending along a length of the seal member that is configured for receiving the shaft of the fastener;

a bracket comprising a flange with a plurality of holes through which the wall anchors are disposed;

wherein the wall system comprises an insulation layer disposed against a base layer with the flange of the bracket being disposed at a surface of the insulation layer opposite the base layer, and wherein when the fasteners are secured to the base layer of the wall system the seal members of the wall anchors extend through the insulation layer with the first ends of the seal members compressed against the base layer to form first seals at the base layer and the opposite second ends of the seal members extend out of the holes in the flange, and wherein the second ends of the seal members are compressed between and contact both the flange and the heads of the fasteners when the fasteners are secured to the wall system to form second seals.

12. The wall fastener assembly of claim 11, wherein the fasteners are longer than the seal members, and wherein the seal members have lengths that are longer than a thickness of the insulation layer.

13. The wall fastener assembly of claim 11, wherein the fasteners comprise screws.

14. The wall fastener assembly of claim 11, wherein the base layer comprises a rigid layer and a barrier layer with the barrier layer disposed between the rigid layer and the insulation layer, and wherein the first ends of the seal members are compressed against the barrier layer to form the first seals with the fasteners extending through the barrier layer and being engaged with the rigid layer.

15. The wall fastener assembly of claim 11, wherein the bracket comprises channel.

16. The wall fastener assembly of claim 11, wherein the flange comprises a first flange and wherein the bracket comprises a second flange disposed at the surface of the insulation layer opposite the base layer, and wherein the second flange includes a plurality of holes through which wall anchors are disposed and secured to the base layer in like manner to the wall anchors disposed in the holes of the first flange.

17. The wall fastener assembly of claim 16, wherein the bracket comprises a hat channel having a pair of legs extending from respective ones of the flanges, and having a face portion extending between the legs whereby the face is spaced from the surface of the insulation.

18. The wall fastener assembly of claim 17, wherein additional holes are provided in at least one of the face portion and the legs.

\* \* \* \* \*